(12) United States Patent
Kim et al.

(10) Patent No.: US 8,623,548 B2
(45) Date of Patent: Jan. 7, 2014

(54) RECHARGEABLE BATTERY

(75) Inventors: Sungbae Kim, Yongin-si (KR);
Yongsam Kim, Yongin-si (KR);
Sangwon Byun, Yongin-si (KR)

(73) Assignees: Samsung SDI Co., Ltd., Yongin-si
(KR); Robert Bosch GmbH, Stuttgart
(DE)

( * ) Notice: Subject to any disclaimer, the term of this patent is extended or adjusted under 35 U.S.C. 154(b) by 336 days.

(21) Appl. No.: 12/826,267

(22) Filed: Jun. 29, 2010

(65) Prior Publication Data
US 2011/0200870 A1 Aug. 18, 2011

(30) Foreign Application Priority Data
Feb. 12, 2010 (KR) .................. 10-2010-0013389

(51) Int. Cl.
*H01M 2/02* (2006.01)
*H01M 2/08* (2006.01)

(52) U.S. Cl.
USPC .......................... 429/181; 429/184

(58) Field of Classification Search
None
See application file for complete search history.

(56) References Cited

U.S. PATENT DOCUMENTS

| | | | |
|---|---|---|---|
| 5,521,021 A * | 5/1996 | Alexandres et al. | 429/54 |
| 2003/0194609 A1 | 10/2003 | Nam et al. | |
| 2005/0095502 A1 | 5/2005 | Sugimune et al. | |
| 2005/0287429 A1 | 12/2005 | Cho et al. | |
| 2007/0202364 A1* | 8/2007 | Uh et al. | 429/7 |
| 2008/0241679 A1 | 10/2008 | Okutani et al. | |
| 2009/0186269 A1 | 7/2009 | Kim et al. | |
| 2011/0076554 A1 | 3/2011 | Nam et al. | |

FOREIGN PATENT DOCUMENTS

| | | |
|---|---|---|
| CN | 1604356 A | 4/2005 |
| CN | 101030657 A | 9/2007 |
| JP | 2000-208130 | 7/2000 |
| JP | 2001-306655 A | 11/2001 |
| JP | 2003-115286 | 4/2003 |
| JP | 2003317678 A | 11/2003 |
| JP | 2008-251213 | 10/2008 |
| JP | 2008-251411 | 10/2008 |
| JP | 2008-305645 | 12/2008 |
| JP | 2009-87729 | 4/2009 |
| JP | 2009-110687 | 5/2009 |
| KR | 10-2005-0033432 A | 4/2005 |
| KR | 10-2007-0014657 A | 2/2007 |

OTHER PUBLICATIONS

Patent Abstract and Japan and English machine translation for JP Publication No. 2007-306655 A, published Nov. 2, 2001 in the name of Morita, 15 pages.

Extended European Search report dated Nov. 3, 2010 issued in corresponding European application No. 10172626.3, listing the U.S. references cited in this IDS, 7 pages.

Full English Machine Translation of JP 2009-087729, 14 pages.

(Continued)

*Primary Examiner* — Milton I Cano
*Assistant Examiner* — Carmen Lyles-Irving
(74) *Attorney, Agent, or Firm* — Christie, Parker & Hale, LLP (57) ABSTRACT

A rechargeable battery includes a case containing an electrode assembly and an electrolyte solution; a cap plate sealing the case; an electrode terminal electrically coupled to the electrode assembly and extending through the cap plate; and a seal gasket positioned between the electrode terminal and the cap plate, wherein the seal gasket has a beveled edge extending around a circumference of the seal gasket.

13 Claims, 9 Drawing Sheets

(56) References Cited

OTHER PUBLICATIONS

Full English Machine Translation of JP 2009-110687, 14 pages.
Patent Abstracts of Japan, and English machine translation of Japanese Publication 2008-251213 dated Oct. 16, 2008, (12 pages).
Patent Abstracts of Japan, and English machine translation of Japanese Publication 2008-305645 dated Dec. 18, 2008, (13 pages).
English Machine Translation of JP 2003-115286, 7 pages.

* cited by examiner

RECHARGEABLE BATTERY

CROSS-REFERENCE TO RELATED APPLICATION

This application claims priority to and the benefit of Korean Patent Application No. 10-2010-0013389, filed on Feb. 12, 2010, the entire content of which is incorporated herein by reference.

BACKGROUND

1. Field

An aspect of the present invention relates to a rechargeable battery.

2. Description of the Related Art

Unlike non-rechargeable, primary batteries, rechargeable batteries can be repeatedly charged and discharged. Lower capacity rechargeable batteries that use single battery cells may be used as power sources for various portable electronic devices such as cellular phones or camcorders. Higher capacity rechargeable batteries that use tens of battery cells connected to each other in a battery pack may be used as power sources for driving motors such as in hybrid electric vehicles (HEV).

Rechargeable batteries are manufactured in various shapes, and representative shapes thereof may include a cylindrical shape and a prismatic shape. Rechargeable batteries are generally configured such that an electrode assembly which is formed by interposing a separator serving as an insulator between positive and negative electrodes, and an electrolyte solution are housed in a case, and a cap plate is installed in the case. Electrode terminals are connected to the electrode assembly and then exposed to the outside through the cap plate.

In some cases, a gap is formed between the electrode terminal and the cap plate, and the electrolyte solution may infiltrate through the gap. As described above, the infiltration of the electrolyte solution through the gap between the electrode terminal and the cap plate may cause an electrical short between the electrode terminal and the cap plate, resulting in deterioration of the battery and reducing the battery capacity. The electrolyte solution may also leak outside through the gap between the electrode terminal and the cap plate, causing corrosions to various elements installed outside the battery. In addition, external moisture may flow into the case through the gap.

SUMMARY

Aspects of the present invention provide a rechargeable battery which can prevent an electrolyte solution from infiltrating through a gap between an electrode terminal and a cap plate.

Aspects of the present invention also provide a rechargeable battery which can improve sealing performance of an electrode terminal.

In one embodiment, a rechargeable battery is provided including a case containing an electrode assembly and an electrolyte solution; a cap plate sealing the case; an electrode terminal electrically coupled to the electrode assembly and extending through the cap plate; and a seal gasket positioned between the electrode terminal and the cap plate, wherein the seal gasket has a beveled edge extending around a circumference of the seal gasket.

In one embodiment, the seal gasket includes a body positioned between the electrode terminal and the cap plate; and a flange extending away from the body and contacting the cap plate, wherein the beveled edge is located on the flange. At least one protrusion or at least one groove contacting the cap plate may be located on the flange and/or on the cap plate. The electrode terminal may include a terminal body penetrating the body of the seal gasket; and a terminal extension extending from the terminal body and contacting the flange of the seal gasket. In one embodiment, the beveled edge is shaped such that a diameter of the seal gasket increases gradually in a direction away from the electrode assembly and the beveled edge may include at least one protrusion or groove.

Further, the beveled edge may contact a first insulator and wherein the first insulator contacts the cap plate. In one embodiment, the first insulator has a beveled edge generally corresponding to the beveled edge of the seal gasket and the first insulator has a groove coupled to the electrode terminal. Additionally, in one embodiment, the first insulator has at least one protrusion or at least one groove adhered to the beveled edge of the seal gasket and the cap plate has a groove coupled to the first insulator.

In one embodiment, the electrode terminal has a first insulator and a second insulator coupled thereto, both the first insulator and the second insulator contacting the cap plate and the cap plate has a groove coupled to the second insulator. Additionally, the electrode terminal may have a terminal plate coupled thereto, the terminal plate contacting the second insulator and 16 and the second insulator may have a groove coupled to the terminal plate.

According to embodiments of the present invention, since at least one protrusion (or groove) is formed in the seal gasket, or at least one groove (or protrusion) corresponding thereto is formed in the cap plate or the lower insulator, infiltration of the electrolyte solution can be more effectively suppressed. In addition, the sealing performance of the electrode terminal can be further improved.

BRIEF DESCRIPTION OF THE DRAWINGS

The objects and features of the present invention will be more apparent from the following detailed description in conjunction with the accompanying drawings, in which.

DETAILED DESCRIPTION

Hereinafter, embodiments of the present invention will be described in detail with reference to the accompanying drawings.

Figure 1A:
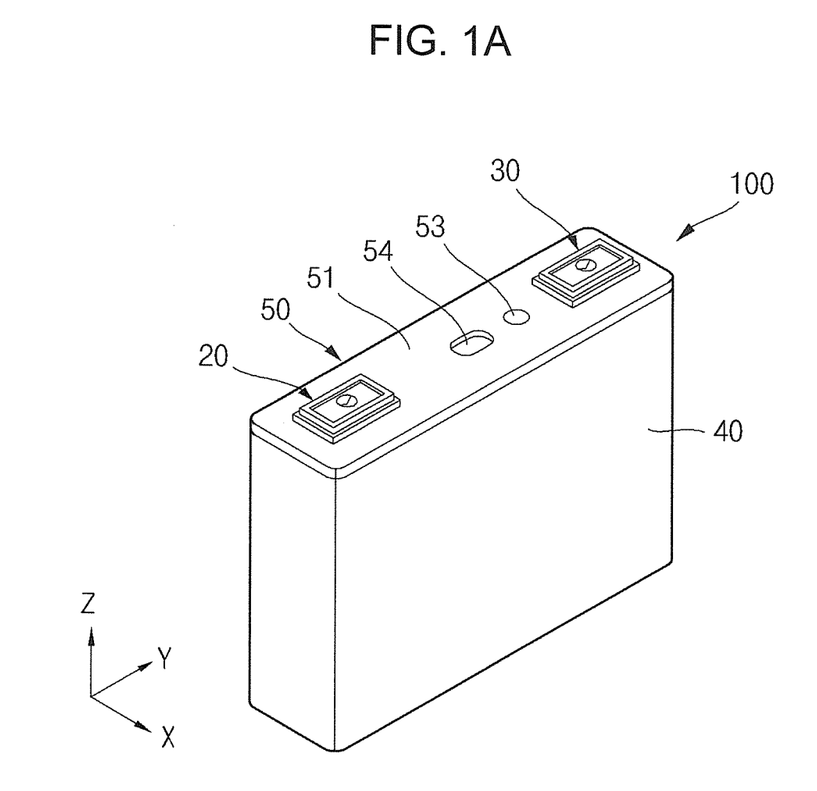
FIGS. 1A, 1B and 1C are a perspective view, a longitudinal sectional view, and an enlarged partial sectional view of a rechargeable battery according to an embodiment of the present invention.
Figure 1B:
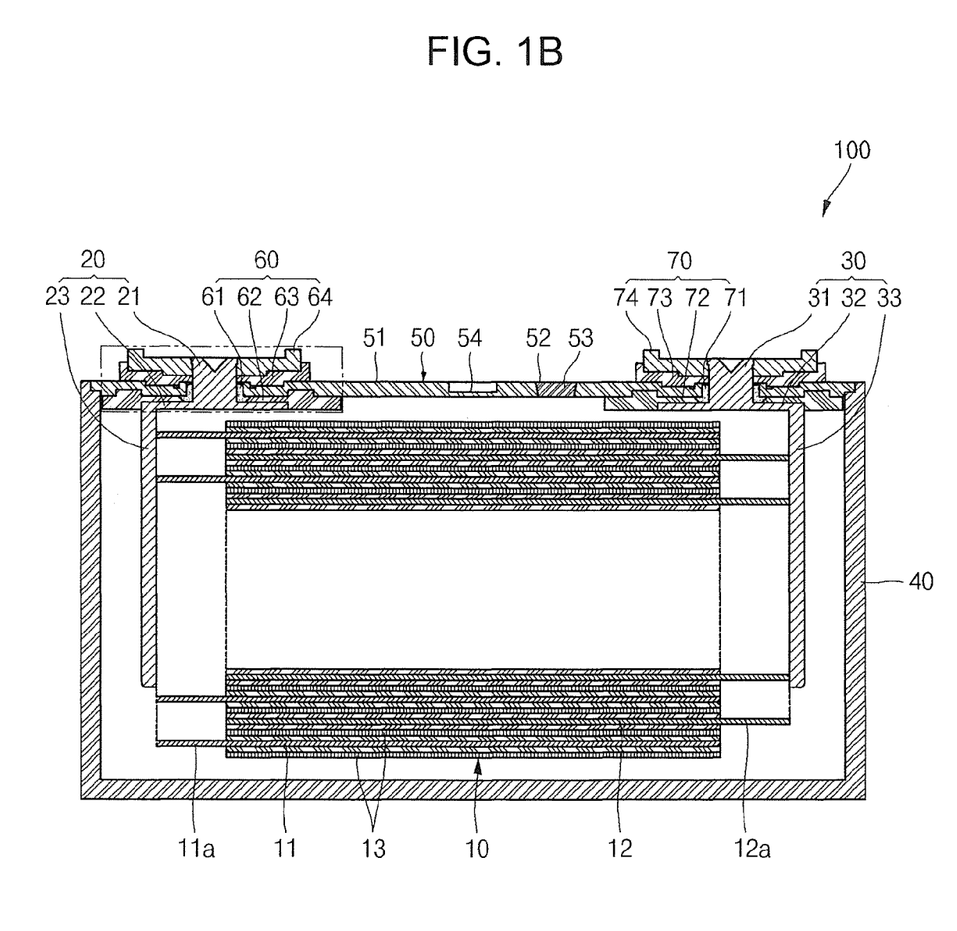
Figure 1C:
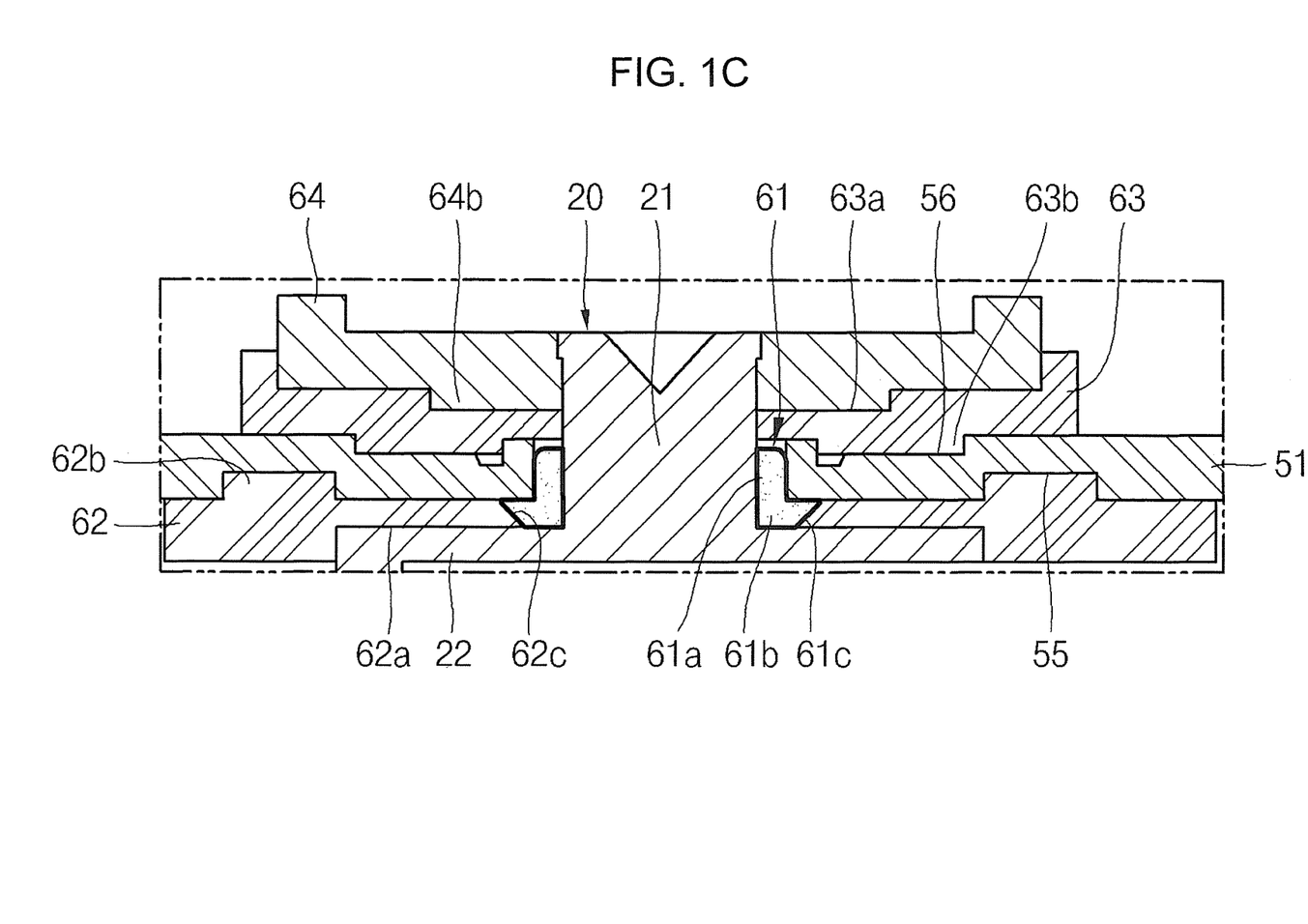

FIGS. 1A, 1B and 1C are a perspective view, a longitudinal sectional view, and an enlarged partial sectional view of a rechargeable battery according to an embodiment of the present invention.

Referring to FIGS. 1A through 1C, the rechargeable battery 100 includes an electrode assembly 10, a first electrode terminal 20, a second electrode terminal 30, a case 40, and a cap assembly 50.

The electrode assembly 10 is formed by winding or laminating a stacked structure of a first electrode plate 11, a separator 13, and a second electrode plate 12. Here, the first electrode plate 11 may function as a cathode and the second electrode plate 12 may function as an anode.

The first electrode plate 11 is formed by coating a first electrode active material formed of a metal foil made of aluminum on a first electrode collector, and includes a first electrode non-coated portion 11a that is not coated with a first electrode active material. The first electrode non-coated portion 11a forms a path of current flow between the first electrode plate 11 and the first electrode terminal 20. Meanwhile, the present invention is not limited to the materials for the first electrode plate 11 listed herein.

The second electrode plate 12 is formed by coating a second electrode active material formed of a metal foil made of nickel or copper on a second electrode collector, and includes a second electrode non-coated portion 12a that is not coated with a second electrode active material. The second electrode non-coated portion 12a forms a path of current flow between the second electrode plate 12 and the second electrode terminal 30. Meanwhile, the present invention is not limited to the materials for the second electrode plate 12 listed herein.

The first electrode plate 11 and the second electrode plate 12 may be arranged to have different polarities.

The separator 13 is positioned between the first electrode plate 11 and the second electrode plate 12 and serves to allow movement of lithium ions while preventing electrical shorts. The separator 13 may be made of polyethylene, polypropylene, or a combination of polyethylene and polypropylene. However, the present invention is not limited to the materials for the separator 13 listed herein.

A first electrode terminal 20 and a second electrode terminal 30 are coupled to respective ends of the aforementioned electrode assembly 10 to be electrically connected to the first electrode plate 11 and the second electrode plate 12, respectively.

The electrode assembly 10 is housed in the case with an electrolyte solution. The electrolyte solution may include an organic solvent such as dimethyl carbonate (DMC), diethyl carbonate (DEC), ethylmethyl carbonate (EMC), ethylene carbonate (EC), propylene carbonate (PC), and the like, and a lithium salt such as $LiPF_6$ or $LiBF_4$. The electrolyte solution is a liquid, a solid or a gel phase.

If the electrolyte solution infiltrates into a gap between the first electrode terminal 20 and the cap assembly 50, or a gap between the second electrode terminal 30 and the cap assembly 50, the infiltration of the electrolyte solution may reduce a breakdown voltage, causing an electrical short between the first electrode terminal 20 and the cap assembly 50, or between the second electrode terminal 30 and the cap assembly 50.

The first electrode terminal 20 may be made of a conductive material such as aluminum, and may be welded to the first electrode non-coated portion 11a protruding to one end of the electrode assembly 10 to be electrically connected to the first electrode plate 11. The first electrode terminal 20 includes a first terminal body 21, a first terminal extending part 22, and a first terminal welding part 23.

The first terminal body 21 penetrates through the cap assembly 50 and has its top end riveted to be fixed to the cap assembly 50. The first terminal extending part 22 horizontally extends from the first terminal body 21 to be closely adhered to a bottom surface of the cap assembly 50.

The first terminal welding part 23 vertically extends from the first terminal extending part 22 to be closely adhered to the first electrode non-coated portion 11a of the electrode assembly 10. In other words, the first terminal welding part 23 is welded to the first electrode non-coated portion 11a.

The second electrode terminal 30 may be made of a conductive material such as nickel, and is brought into contact with the second electrode non-coated portion 12a protruding to the other end of the electrode assembly 10 to be electrically connected to the second electrode plate 12. The second electrode terminal 30 includes a second terminal body 31, a second terminal extending part 32, and a second terminal welding part 33.

In the second electrode terminal 30, the second terminal body 31, the second terminal extending part 32 and the second terminal welding part 33 have substantially the same shape and use as the first terminal body 21, the first terminal extending part 22 and the first terminal welding part 23 in the first electrode terminal 20, and repetitive descriptions thereof will not be given.

The case 40 may be made of a conductive metal such as aluminum, aluminum alloy or nickel plated steel, and may take an approximately hexagonal shape that defines an inner space for receiving the electrode assembly 10, the first electrode terminal 20, the second electrode terminal 30 and the electrolyte solution electrode assembly 14. Referring to FIGS. 1A and 1B illustrating a state in which the case 40 and the cap assembly 50 are assembled, although an opening is not shown, the opening corresponding to a circumference of the cap assembly 50. In one embodiment, the internal surface of the case 40 is insulated to be electrically insulated from the electrode assembly 10, the first electrode terminal 20 and the second electrode terminal 30.

The cap assembly 50 is coupled to the case 40. The cap assembly 50 includes a cap plate 51. The cap plate 51 seals an opening of the case 40, and may be made of the same material as the case 40. In addition, the cap plate 51 includes a plug 53 closing an electrolyte solution injection hole 52, and a safety vent 54 that is a relatively thin portion.

The cap assembly 50 may also include a first sealing part 60 and a second sealing part 70.

The first sealing part 60 includes a first seal gasket 61 through which the first terminal body 21 of the first electrode terminal 20 penetrates, a first lower insulator 62, a first upper insulator 63, and a first terminal plate 64.

The second sealing part 70 includes a second seal gasket 71 through which the second terminal body 31 of the second electrode terminal 30 penetrates, a second lower insulator 72, a second upper insulator 73, and a second terminal plate 74.

Since the first sealing part 60 and the second sealing part 70 have substantially the same configuration, embodiments of the invention will be described with regard to a configuration of the first sealing part 60. In addition, in the following description, the first electrode terminal 20 will be referred to as an electrode terminal 20, the first terminal body 21 as a terminal body 21, the first terminal extending part 22 as a terminal extending part 22, the first seal gasket 61 as a seal gasket 61, the first lower insulator 62 as a lower insulator 62, the first upper insulator 63 as an upper insulator 63, and the first terminal plate 64 as a terminal plate 64.

As illustrated in FIG. 1C, since the seal gasket 61 is located between the electrode terminal 20 and the cap plate 51, a breakdown voltage between the electrode terminal 20 and the cap plate 51 is maintained at a relatively high level, thereby preventing an electrical short therebetween. To this end, the seal gasket 61 is formed using an insulating material. In addition, since the seal gasket 61 prevents the electrolyte solution from infiltrating into a gap between the cap plate 51 and the electrode terminal 20, the breakdown between the electrode terminal 20 and the cap plate 51 is increased, thereby preventing an unnecessary electrical short. In greater detail, the seal gasket 61 prevents the electrolyte solution from infiltrating a gap between the cap plate 51 and the terminal body 21, and a gap between the cap plate 51 and the terminal extending part 22, thereby preventing an unnecessary electrical short between the cap plate 51 and the electrode terminal 20. Further, the seal gasket 61 may prevent external moisture from entering the case 40 through the gap between the cap plate 51 and the electrode terminal 20.

The seal gasket 61 includes a body 61a and a flange 61b. The body 61a wraps around the terminal body 21 in an approximately tubular shape, thereby preventing an electrical short between the terminal body 21 and the cap plate 51. The flange 61b is bent from the body 61a and extends horizontally and outwardly away from the body 61a to be closely adhered to the bottom surface of the cap plate 51. In other words, the flange 61b is positioned between the bottom surface of the cap plate 51 and the terminal extending part 22. A slope or beveled edge 61c is formed at an end of the flange 61b such that a diameter of the seal gasket 61 gradually increases from a lower portion to an upper portion. In other words, the beveled edge 61c is formed at the end of the flange 61b such that the diameter of the seal gasket 61 gradually increases in a direction away from the electrode assembly such that the beveled edge is slanted generally toward the electrode assembly 10.

The lower insulator 62 is positioned at the exterior side of the flange 61b and is closely adhered to the bottom surface of the cap plate 51. In addition, a portion of the lower insulator 62 is closely adhered to a region between the terminal extending part 22 and the cap plate 51. Further, the lower insulator 62 has a sloping surface 62c to be closely adhered to the beveled edge 61c.

Since the beveled edge 61c of the seal gasket 61 and the sloping surface 62c of the lower insulator 62 are closely adhered to each other, the electrolyte solution is not able to easily infiltrate the cap plate 51 through a gap created between the beveled edge 61c of the seal gasket 61 and the sloping surface 62c of the lower insulator 62. In addition, since the seal gasket 61 and the lower insulator 62 are securely adhered to the cap plate 51 by the electrode terminal 20, the sealing performance of the battery, specifically, the electrode terminal 20, is further improved.

In one embodiment, a groove 62a may be formed on the bottom surface of the lower insulator 62. The groove 62a is coupled to the terminal extending part 22 of the electrode terminal 20 to prevent the electrode terminal 20 from rotating. In addition, a groove 55 may be formed on the bottom surface of the cap plate 51. The groove 55 is coupled to the lower insulator 62 to prevent the lower insulator 62 from rotating. For the purpose of preventing rotation, a protrusion 62b may be formed on the top surface of the lower insulator 62.

The upper insulator 63 is coupled to the terminal body 21 of the electrode terminal 20 and is closely adhered to the top surface of the cap plate 51. Here, a groove 56 may be formed on the top surface of the cap plate 51. The groove 56 is coupled to the upper insulator 63 to prevent the upper insulator 63 from rotating. In one embodiment, for the purpose of preventing rotation, a protrusion 63b may be formed on the bottom surface of the upper insulator 63.

The terminal plate 64 is coupled to the terminal body 21 of the electrode terminal 20 and is closely adhered to the top surface of the upper insulator 63. Here, a groove 63a may be formed on the top surface of the upper insulator 63. The groove 63a is coupled to the terminal plate 64 to prevent the terminal plate 64 from rotating. Of course, for the purpose of preventing rotation, a protrusion 64b may be formed on the bottom surface of the terminal plate 64.

Meanwhile, the terminal body 21 of the electrode terminal 20 is riveted at its top end, thereby being firmly fixed to the terminal plate 64.

As described above, according to an embodiment the present invention, since the seal gasket 61 is located between the electrode terminal 20 and the cap plate 51, an electrolyte solution is unlikely to infiltrate a gap between the cap plate 51 and the electrode terminal 20. Accordingly, an unnecessary electrical short between the electrode terminal 20 and the cap plate 51 can be prevented. In addition, since the beveled edge 61c is formed on the seal gasket 61 and the corresponding sloping surface 62c is formed on the lower insulator 62, it is difficult for the electrolyte solution to reach the cap plate 51 through an interface between the beveled edge 61c of the seal gasket 61 and the sloping surface 62c of the lower insulator 62. An electrical short, which can be caused by a reduced breakdown voltage between the electrode terminal 20 and the cap plate 51 as the electrolyte solution infiltrates, may be more effectively prevented.

Figure 2:
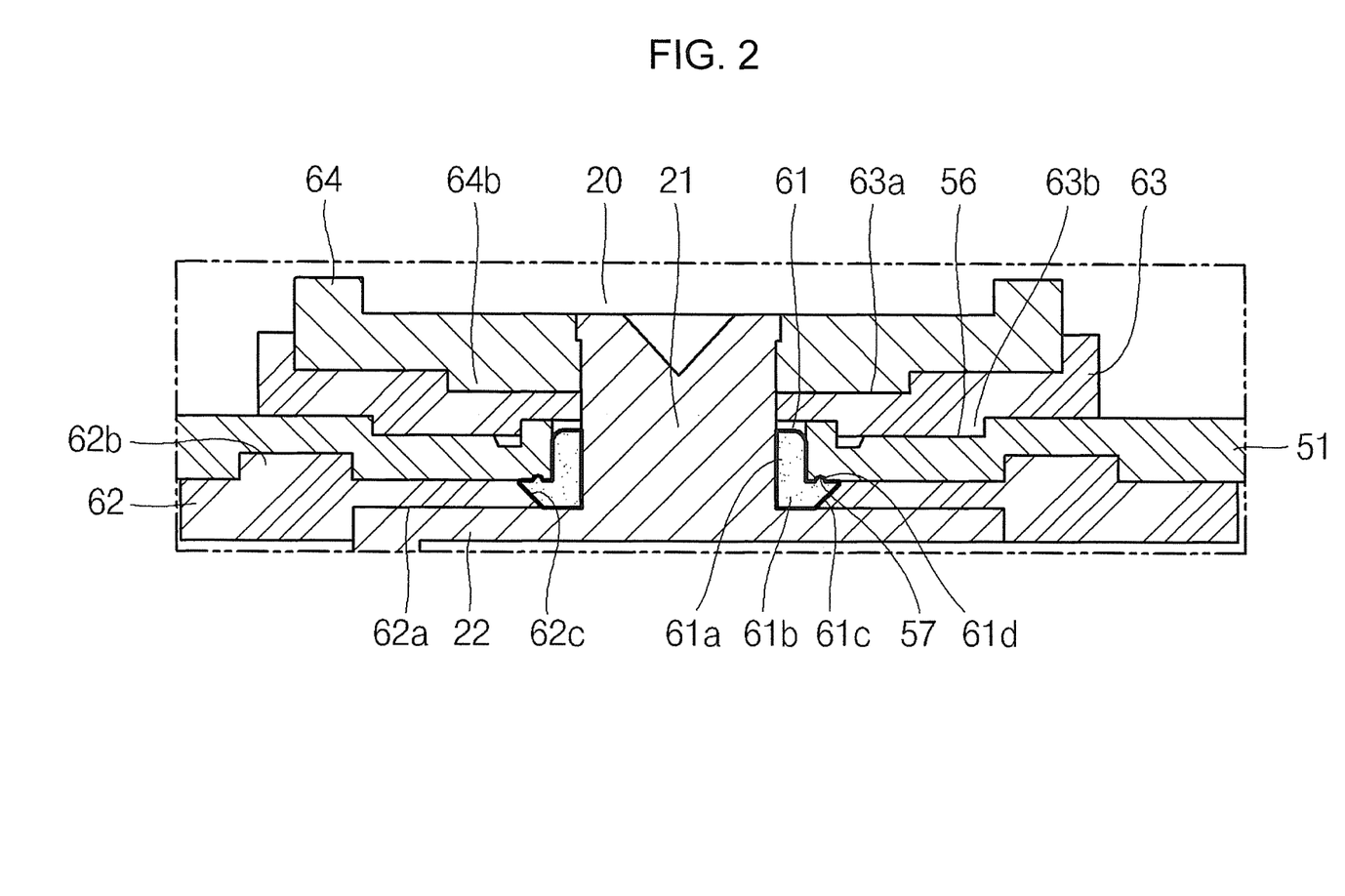
FIG. 2 is a sectional view of a portion of a rechargeable battery according to another embodiment of the present invention.

FIG. 2 is a sectional view of a rechargeable battery according to another embodiment of the present invention.

As illustrated in FIG. 2, a protrusion 61d may further be formed on a top surface, i.e., a surface facing generally away from the electrode assembly 10, of a flange 61b of a seal gasket 61. The protrusion 61d further improves sealing capacity between the flange 61b of the seal gasket 61 and the cap plate 51. Although only one protrusion 61d is illustrated in FIG. 2, a plurality of protrusions may be formed. In addition, although the protrusion 61d illustrated in FIG. 2 has a semicircular shape, it may have a triangular shape, a rectangular shape, or the like.

Further, a groove 57 may be formed at a region of the cap plate 51 generally corresponding to the protrusion 61d formed on the flange 61b. In other words, the protrusion 61d of the flange 61b may be coupled to the groove 57 of the cap plate 51. Alternatively, the groove 57 may be omitted from the cap plate 51 even when the seal gasket 61 with a protrusion 61d is used.

As described above, according to an embodiment of the present invention, since the protrusion 61d is formed in the seal gasket 61, the sealing performance of the battery can be further improved.

Figure 3:
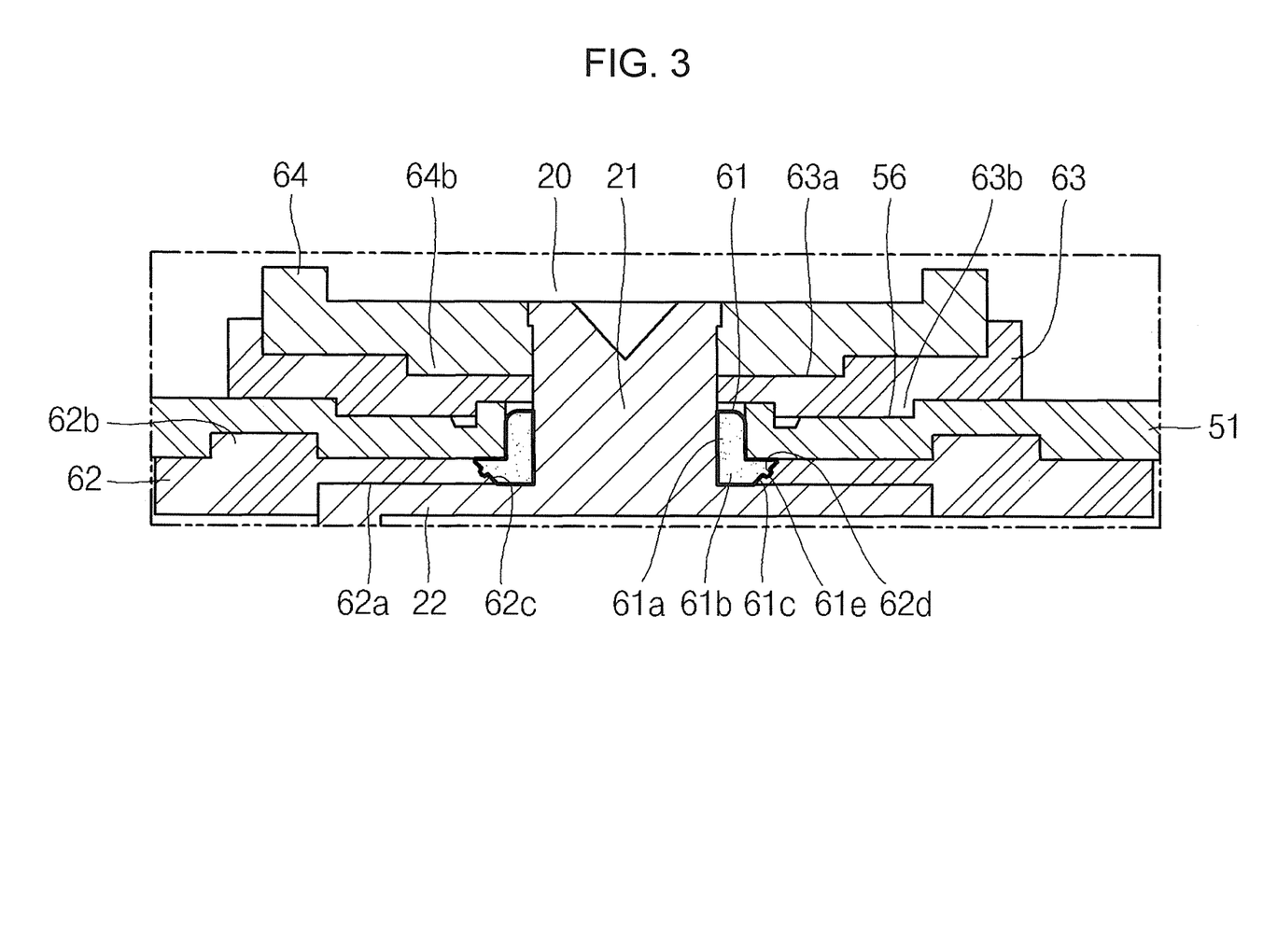
FIG. 3 is a sectional view of a portion of a rechargeable battery according to still another embodiment of the present invention.

FIG. 3 is a sectional view of a rechargeable battery according to still another embodiment of the present invention.

As illustrated in FIG. 3, a protrusion 61e may further be formed on a beveled edge 61c of a flange 61b of a seal gasket 61. The protrusion 61e further improves sealing capacity between the beveled edge 61c of the flange 61b of the seal gasket 61 and the sloping surface 62c of the lower insulator 62. Although only one protrusion 61e is illustrated in FIG. 3, a plurality of protrusions may be formed. In addition, although the protrusion 61e illustrated in FIG. 3 has a semicircular shape, it may have a triangular shape, a rectangular shape, or the like.

Further, a groove 62d may be formed on the sloping surface 62c of the lower insulator 62 generally corresponding to the protrusion 61e formed on the beveled edge 61c of the flange 61b. In other words, the protrusion 61e of the beveled edge 61c of the flange 61b may be coupled to the groove 62d of the sloping surface 62c of the lower insulator 62. Alternatively, the groove 62d may be omitted on the sloping surface 62c of the lower insulator 62 even when the seal gasket 61 with a protrusion 61e is used.

As described above, according to an embodiment of the present invention, since the protrusion 61d is formed in the seal gasket 61, the sealing performance of the battery can be further improved.

As described above, according to an embodiment of the present invention, since the protrusion 61e is formed on the beveled edge 61c of the flange 61b in the seal gasket 61, an electrolyte solution is unlikely to infiltrate into a gap between the beveled edge 61c of the flange 61b and the sloping surface 62c of the lower insulator 62, thereby preventing an electrical short between the electrode terminal 20 and the cap plate 51 and further improving the sealing performance of the battery.

As described above, according to an embodiment of the present invention, since the protrusions 61d and 61e are formed on the top surface of the flange 61b and the beveled edge 61c in the seal gasket 61, respectively, the sealing performance of the battery is further improved. In addition, the electrical short between the electrode terminal 20 and the cap plate 51 can be prevented by effectively suppressing infiltration of the electrolyte solution.

Figure 4:
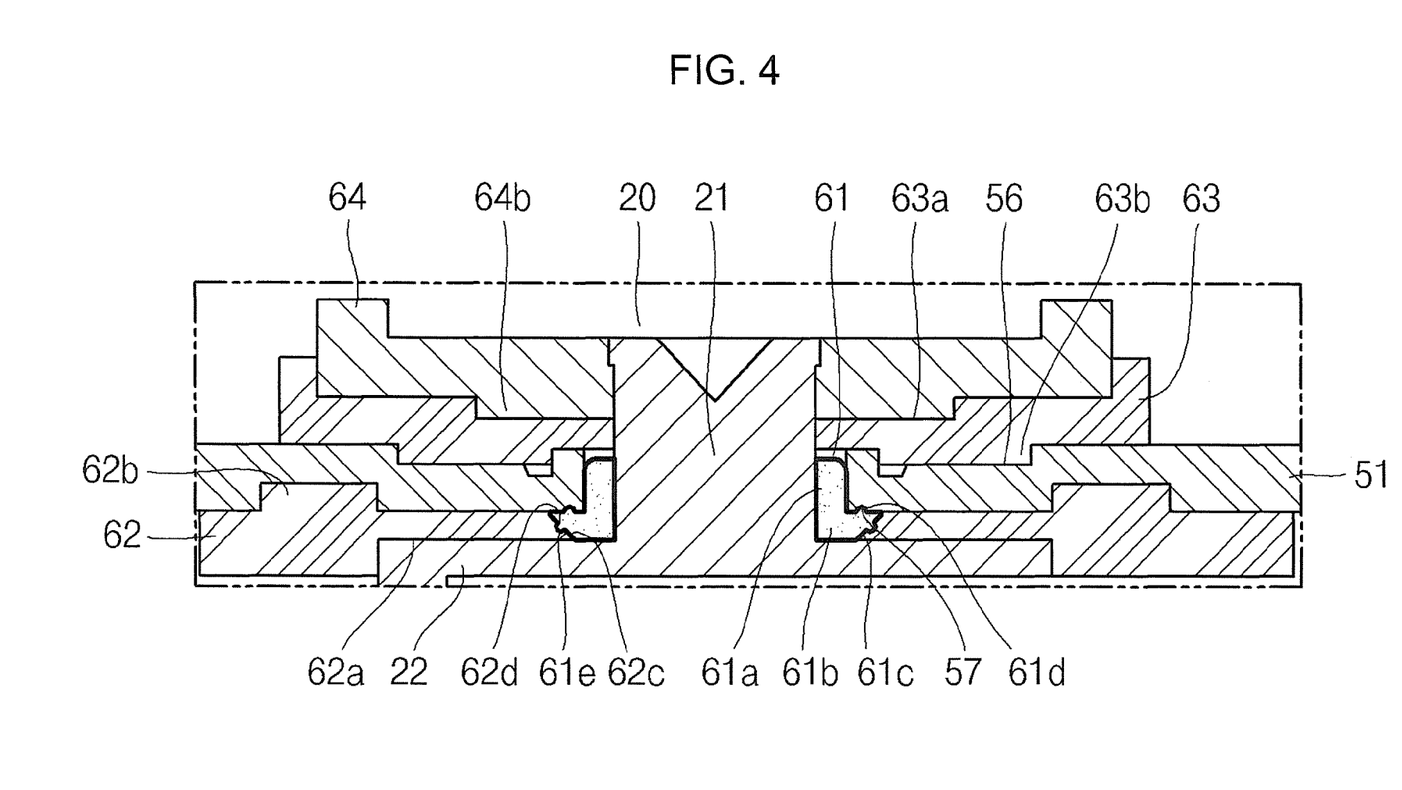
FIG. 4 is a sectional view of a portion of a rechargeable battery according to yet another embodiment of the present invention.

FIG. 4 is a sectional view of a rechargeable battery according to still another further embodiment of the present invention.

As illustrated in FIG. 4, protrusions 61d and 61e may be formed on a top surface of a flange 61b and a beveled edge 61c of a seal gasket 61, respectively. The protrusions 61d and 61e further improve sealing capacity of a battery and prevent an electrical short between the electrode terminal 20 and the cap plate 51 due to a reduced breakdown voltage therebetween by suppressing infiltration of an electrolyte solution. Although FIG. 4 illustrates that a single protrusion 61d, 61e is formed on each of the top surface of the flange 61b and on the beveled edge 61c, a plurality of protrusions may be formed thereon. In addition, although each of the protrusions 61d and 61e illustrated in FIG. 4 has a semi-circular shape, they may have a triangular shape, a rectangular shape, or the like.

In addition, a groove 57 may be formed at a region of the cap plate 51 generally corresponding to the protrusion 61d formed on the flange 61b. In other words, the protrusion 61d of the flange 61b may be coupled to the groove 57 of the cap plate 51. Alternatively, the groove 57 may be omitted from the cap plate 51.

Further, a groove 62d may be formed on the sloping surface 62c of the lower insulator 62 generally corresponding to the protrusion 61e formed on the beveled edge 61c. In other words, the protrusion 61e of the beveled edge 61c may be coupled to the groove 62d of the sloping surface 62c of the lower insulator 62. Alternatively, the groove 62d may be omitted from the sloping surface 62c of the lower insulator 62.

Figure 5:
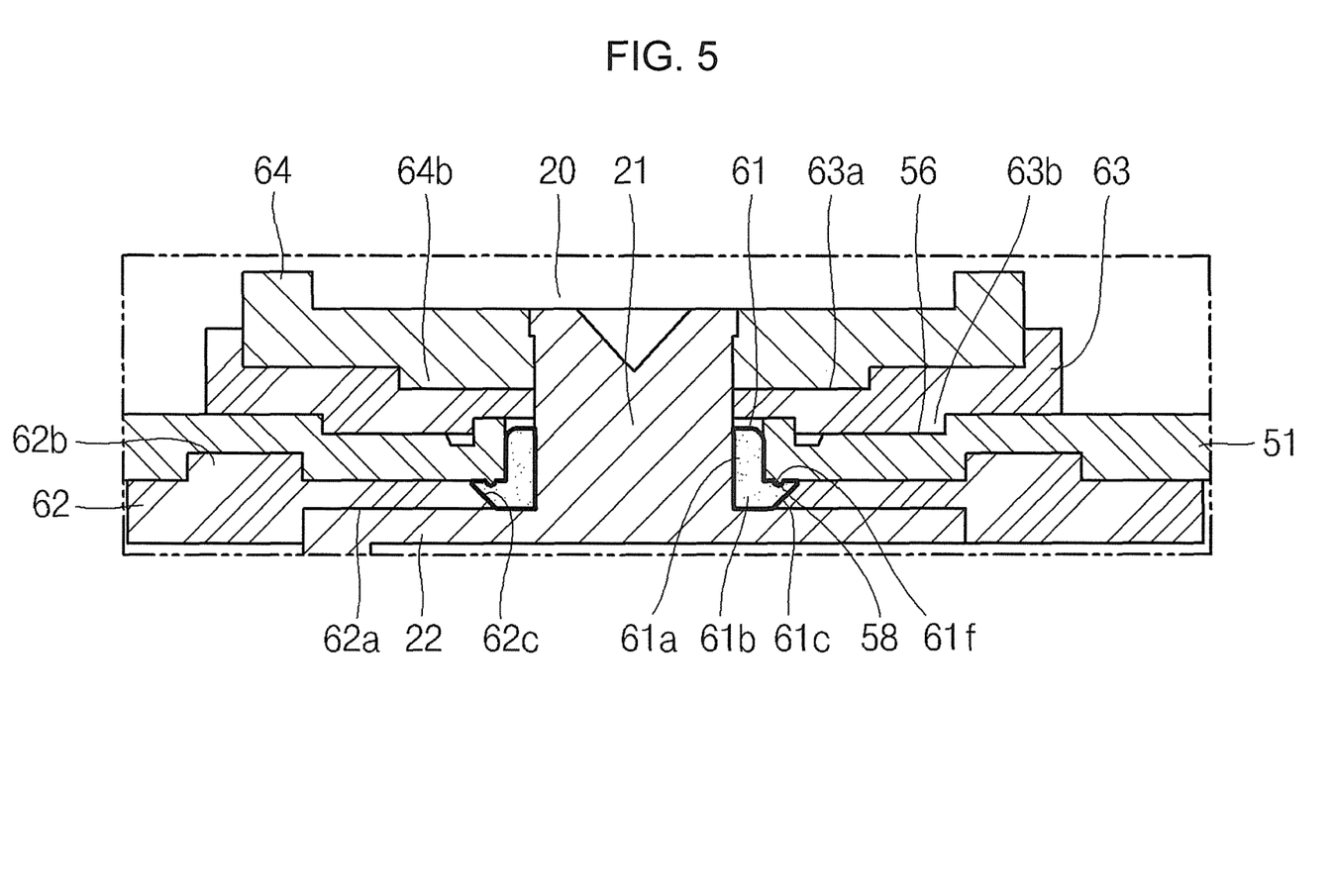
FIG. 5 is a sectional view of a portion of a rechargeable battery according to still another embodiment of the present invention.

FIG. 5 is a sectional view of a rechargeable battery according to still another further embodiment of the present invention.

As illustrated in FIG. 5, a protrusion 58 may be formed on the cap plate 51 corresponding to a top surface of a flange 61b in a seal gasket 61. The protrusion 58 further improves the sealing capacity between the flange 61b of the seal gasket 61 and the cap plate 51. Although FIG. 5 illustrates only one protrusion 58, a plurality of protrusions may be provided. In addition, although each of the protrusions 58 illustrated in FIG. 5 has a semi-circular shape, they may have a triangular shape, a rectangular shape, or the like.

In addition, a groove 57f may be formed at a region of the flange 61b generally corresponding to the protrusion 58 formed on the cap plate 51. In other words, the protrusion 58 of the cap plate 51 may be coupled to the groove 57f of the flange 61b. Alternatively, the groove 61f may be omitted from the flange 61b.

As described above, according to an embodiment of the present invention, since the protrusion 58 is formed on the cap plate 51, the sealing performance of the battery is improved.

Figure 6:
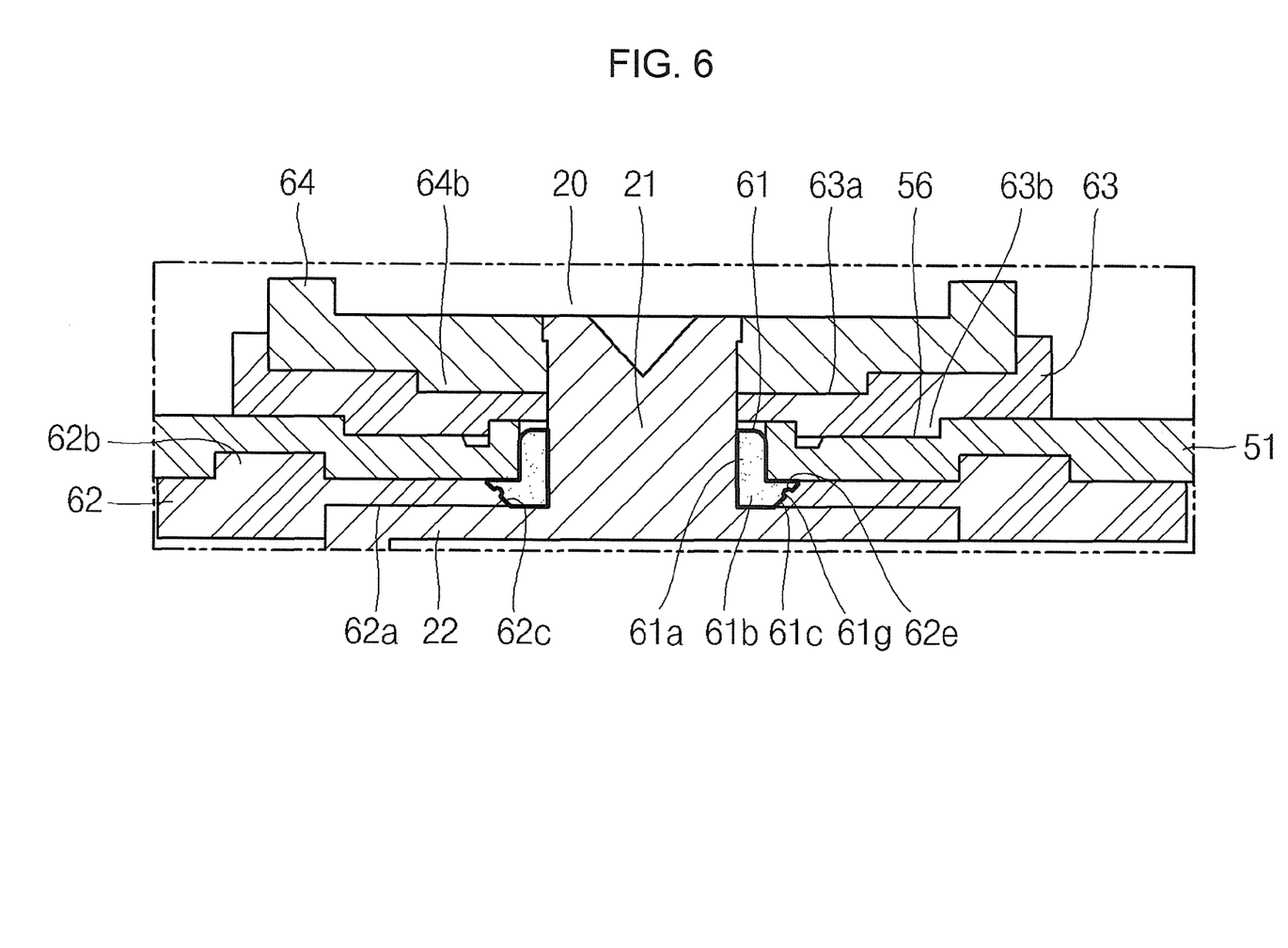
FIG. 6 is a sectional view of a portion of a rechargeable battery according to yet another embodiment of the present invention.

FIG. 6 is a sectional view of a rechargeable battery according to still another further embodiment of the present invention.

As illustrated in FIG. 6, a protrusion 61e may further be formed on a sloping surface 62c of a lower insulator 62. The protrusion 61e further improves sealing capacity between a beveled edge 61c of a flange 61b in a seal gasket 61 and the sloping surface 62c of the lower insulator 62. Although only one protrusion 61e is illustrated in FIG. 6, a plurality of protrusions may be formed. In addition, although the protrusion 61e illustrated in FIG. 6 has a semi-circular shape, it may have a triangular shape, a rectangular shape, or the like.

Further, a groove 62g may be formed on the beveled edge 61c of the flange 61b in the seal gasket 61 generally corresponding to the protrusion 62e formed on the sloping surface 62c. In other words, the protrusion 62e of the sloping surface 62c may be coupled to the groove 62g of the beveled edge 61c of the flange 61b. Alternatively, the groove 62g may be omitted from the beveled edge 61c of the flange 61b.

As described above, according to an embodiment of the present invention, since the protrusion 61e is further formed in the sloping surface 62c of the lower insulator 62, the sealing performance of the battery can be further improved while suppressing an electrolyte solution from infiltrating into the cap plate 51.

Figure 7:
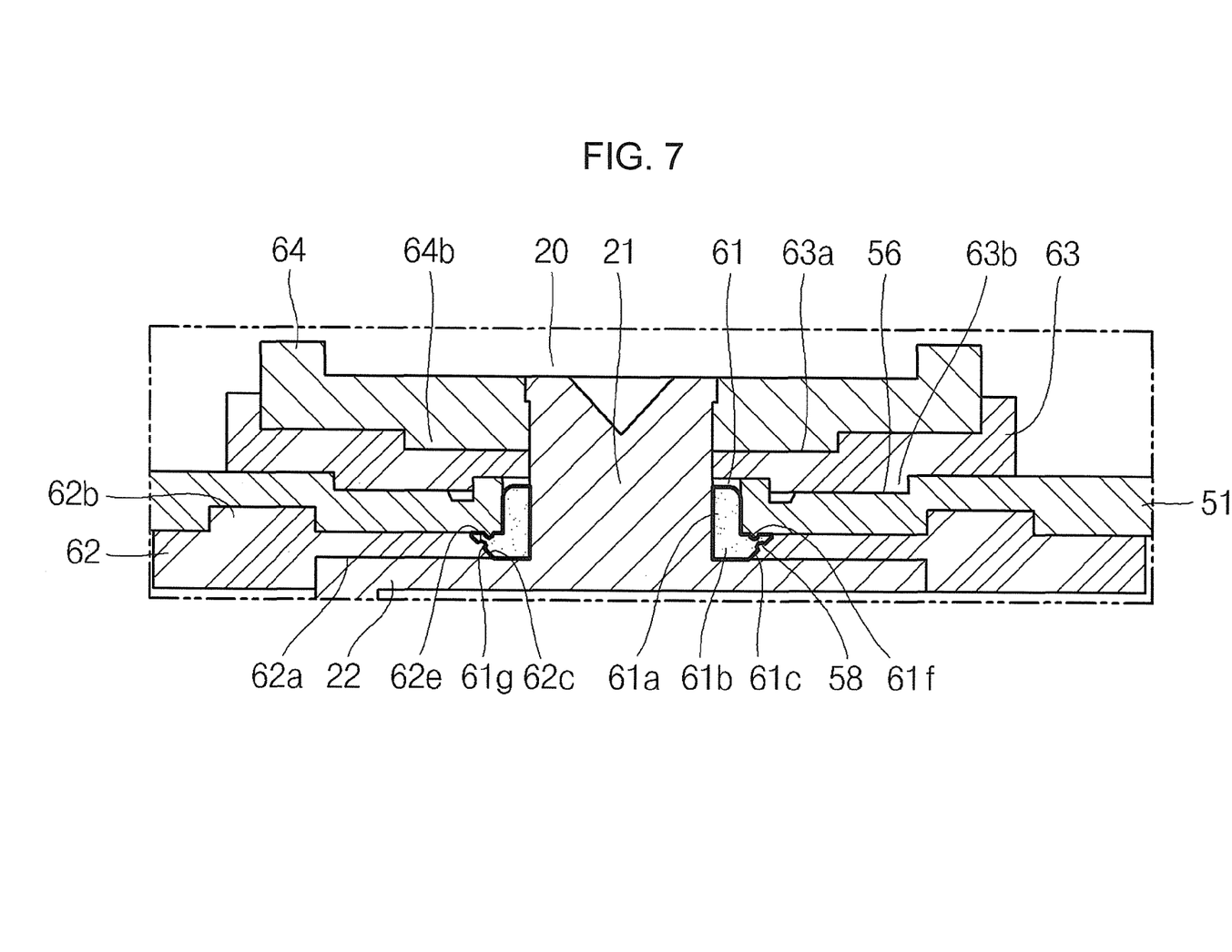
FIG. 7 is a sectional view of a portion of a rechargeable battery according to still another further embodiment of the present invention.

FIG. 7 is a sectional view of a rechargeable battery according to still another further embodiment of the present invention.

As illustrated in FIG. 7, protrusions 58 and 62e may be formed on a bottom surface of a cap plate 51 and a sloping surface 62c of a lower insulator 62, respectively. The protrusions 58 and 62e further improve sealing capacity at a gap between a flange 61b of the seal gasket 61 and the cap plate 51 and a gap between a beveled edge 61c formed on the flange 61b of the seal gasket 61 and the sloping surface 62c of the lower insulator 62. In addition, infiltration of an electrolyte solution into the gap between the beveled edge 61c formed on the flange 61b of the seal gasket 61 and the sloping surface 62c of the lower insulator 62 can be suppressed. Although FIG. 7 illustrates that a single protrusion 58, 62e is formed on each of the bottom surface of the cap plate 51 and on the sloping surface 62c of the lower insulator 62, a plurality of protrusions may be formed thereon. In addition, although each of the protrusions 58 and 62e illustrated in FIG. 7 has a semi-circular shape, they may have a triangular shape, a rectangular shape, or the like.

In addition, a groove 61f may be formed at a region of the flange 61b generally corresponding to the protrusion 58 formed on the cap plate 51. In other words, the protrusion 58 formed on the cap plate 51 may be coupled to the groove 61f of the flange 61b.

Further, a groove 61g may be formed on the beveled edge 61c of the flange 61b generally corresponding to the protrusion 62e formed on the sloping surface 62c. In other words, the protrusion 62e of the sloping surface 62c may be coupled to the groove 61g of the beveled edge 61c. Alternatively, the groove 61f may be omitted from the flange 61b and the groove 61g may be omitted from the beveled edge 61c.

As described above, according to an embodiment of the present invention, since the protrusions 58 and 62e are further formed on the bottom surface of the cap plate 51 and on the sloping surface 62c of the lower insulator 62, the sealing performance of the electrode terminal 20 can be further improved, while suppressing an electrolyte solution from infiltrating into the cap plate 51.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A rechargeable battery comprising:
   a case containing an electrode assembly and an electrolyte solution;
   a cap plate sealing the case;
   an electrode terminal electrically coupled to the electrode assembly and extending through the cap plate; and
   a seal gasket enclosed within the case and cap plate and located between the electrode terminal and the cap plate; and
   a first insulator contacting a lower surface of the cap plate, wherein the seal gasket comprises:
      a body positioned between the electrode terminal and the cap plate; and
      a flange extending away from the body and contacting the lower surface of the cap plate, wherein the flange has a beveled edge located on an outermost periphery of the flange, wherein the beveled edge contacts the first insulator.

2. The rechargeable battery of claim 1, wherein at least one protrusion or at least one groove contacting the cap plate is located on the flange.

3. The rechargeable battery of claim 1, wherein at least one protrusion or at least one groove contacting the flange is located on the cap plate.

4. The rechargeable battery of claim 1, wherein the electrode terminal comprises:
   a terminal body penetrating the body of the seal gasket; and
   a terminal extension extending from the terminal body and contacting the flange of the seal gasket.

5. The rechargeable battery of claim 1, wherein the beveled edge includes at least one protrusion or groove.

6. The rechargeable battery of claim 1, wherein the first insulator has a beveled edge generally corresponding to the beveled edge of the seal gasket.

7. The rechargeable battery of claim 1, wherein the first insulator has a groove coupled to the electrode terminal.

8. The rechargeable battery of claim 1, wherein the first insulator has at least one protrusion or at least one groove adhered to the beveled edge of the seal gasket.

9. The rechargeable battery of claim 1, wherein the cap plate has a groove coupled to the first insulator.

10. The rechargeable battery of claim 1, wherein the electrode terminal has a first insulator and a second insulator coupled thereto, both the first insulator and the second insulator contacting the cap plate.

11. The rechargeable battery of claim 10, wherein the cap plate has a groove coupled to the second insulator.

12. The rechargeable battery of claim 10, wherein the electrode terminal has a terminal plate coupled thereto, the terminal plate contacting the second insulator.

13. The rechargeable battery of claim 12, wherein the second insulator has a groove coupled to the terminal plate.

* * * * *